Dec. 31, 1957     S. J. ERLING     2,818,076
APPARATUS FOR CLEANING OF PIPELINES FOR MILK, AND THE LIKE
Filed June 16, 1954
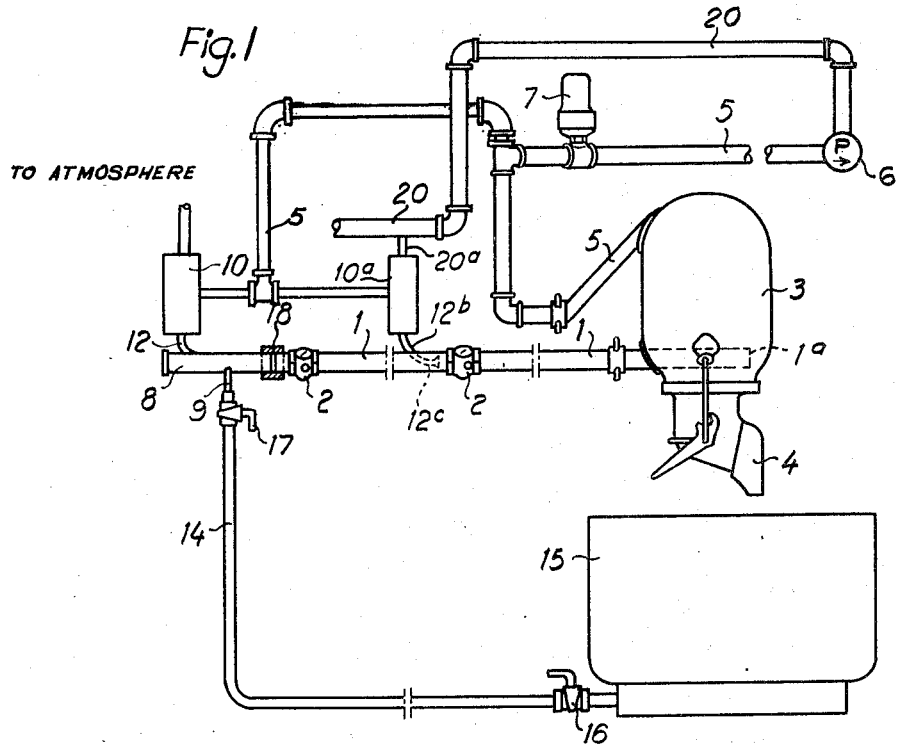
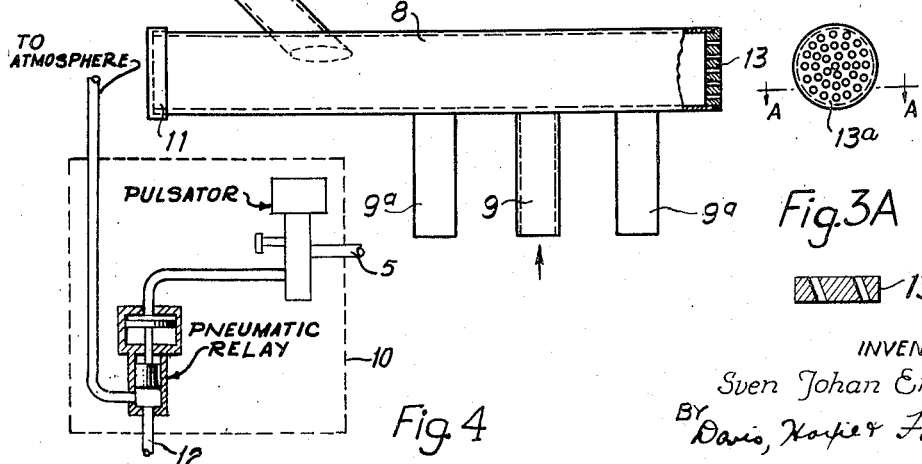
INVENTOR.
Sven Johan Erling
BY Davis, Hoxie & Faithfull
ATTORNEYS

United States Patent Office 2,818,076
Patented Dec. 31, 1957

2,818,076

APPARATUS FOR CLEANING OF PIPELINES FOR MILK AND THE LIKE

Sven Johan Erling, Bromma, Sweden, assignor to Aktiebolaget Separator, Stockholm, Sweden, a corporation of Sweden Application June 16, 1954, Serial No. 437,166

5 Claims. (Cl. 134—102)

This invention relates to an apparatus for the cleaning of pipe-lines of milking insallations, and the like, and has particular reference to an improved apparatus for this purpose.

It has become common practice in milking machine installations to lead the milk directly from the cows to a common collecting place, which, in many cases, is located at a great distance from the milking place and arranged to receive the milk from a large number of cows and many milking units. Especially in large milking machine installations, the necessary milking lines are of considerable length.

All lines for milk should be kept thoroughly clean and as sterile as possible. For this purpose, the lines are flushed with a liquid (e. g., lye or diluted acid) which is capable of dissolving milk residues left in the milk pipe and carrying them away from the system. It is important to be able to clean the milk line, as well as the other parts of the installation which have come into contact with the milk, rapidly and reliably and with little manual labor, without making it necessary to give any great care to the cleaning. Such pipe lines can, of course, be taken apart so that the various pipe sections may be disconnected from each other and removed to a place for washing them with the aid of mechanical means, in addition to the liquid that is to be used. However, it is not feasible to perform such a time-consuming cleaning operation except at long intervals, and the daily treatment is therefore usually carried out in such a way that the lines are merely flushed with liquid of the kind mentioned.

The simplest way of forcing the liquid through the lines is sucking it through the line by means of the vacuum normally used to drive the milking units and suck the milk through the line to the collecting place. In so doing, however, some atmospheric air leaks into the pipe-line at the connecting points for the milking units, and gases dissolved in the liquid are released. Consequently, the pipes will not be filled with flushing liquid, and in the upper part of the pipes there will remain a string of milk residues which never come into contact with the flushing liquid, these milk residues being neither dissolved by the liquid nor flushed away by it. This condition can be overcome by forcing the liquid with overpressure into the line; but for that purpose a special pump is required which, in view of the necessity of avoiding manual labor as much as possible, must be motor-driven and therefore will be relatively expensive. This additional expense is of particular importance in smaller plants, where the cost of such a pump will be practically the same as in larger plants.

According to the present invention, the milk residues in the pipes can be eliminated without the use of a special overpressure pump by flowing the flushing liquid through the line while admitting air or other gas into the line, and varying the rate of admission of the gas, as by interrupting its flow or alternatively decreasing and increasing its flow rate. The gas thus admitted can be at sub-atmospheric, atmospheric or super-atmospheric pressure; and it can be passed into the milk line at the point where the flushing liquid is sucked in, which should take place in that part of the line most remote from the vacuum pump so that all of the line which has been contacted by milk will be flushed. Alternatively, the air or other gas may be supplied at several points along the line. If the latter has branches, flushing liquid as well as gas should be supplied at the outer end of each branch. In cases where the milk line forms a system of many pipe sections communicating with each other at many points, valves or other closing means should be arranged in the pipe-line in such a way that each section is passed entirely by the flushing liquid in a certain direction.

As previously mentioned, the gas is admitted into the pipe-line at a varying rate of flow. The gas supply line should therefore be alternately opened and throttled or closed. This can be effected, for example, by means of a pulsating device driven by a standard pulsator of the kind commonly used for varying the pneumatic pressure in the teat cups of milking units. It can also be effected by means of a modified form of the vacuum regulating valve commonly used in milking plants for maintaining a fixed vacuum generally about ½ atm. Such regulating valves usually include a weight or spring-loaded valve body arranged to admit atmospheric air into the vacuum line when the regulated vacuum tends to be exceeded. By suitably dimensioning certain channels, the valve body can be made to oscillate so that it is alternately closed and opened and thereby admits air periodically into the line. If a vacuum regulating valve modified in this manner is applied to the gas inlet for the milk pipe-line, the gas will be admitted into this pipe-line intermittently or in a periodically varying flow.

It is advantageous to have a higher vacuum when flushing than during the milking operation. Therefore, the vacuum regulating valve used in the normal milking operation, which is usually located in the vicinity of the vacuum pump, should be put out of operation in an entirely closed position during the flushing.

It is important that the air or other gas admitted into the milk pipe-line be supplied in such a way that it sets the flushing liquid in a motion which will cause all parts of the surface of the line to be flushed and cleaned. For this purpose it may be desirable to provide guide rails or other directing means for the flushing liquid so that the latter will move in spiral paths within the milk pipe and thus undergo more or less of a screwing movement. When the gas is admitted at a varying rate, the liquid mass moving through the pipe is more or less divided into slugs or balls which tend to move along the pipeline as individual units separated by pockets of the air or other gas. In long lines it has been found that these individual units gradually tend to become merged so that the liquid then flows in the lower part of the pipe without coming into contact with the upper part of the pipe wall. If more gas is supplied along the flow path, new units are formed which will remain as separate units for a further distance forward in the pipe-line, at which point more gas should be supplied to prevent merging of the liquid slugs or units, etc. In this manner it is possible, throughout the length of the pipe, to maintain a liquid flow which is highly efficient for the cleaning operation. It may be desirable to introduce the gas tangentially in relation to the pipe-line section (which in practice is round). The gas will then influence the liquid mass tangentially, which results in a repeated or increased screwing movement of the liquid slugs.

For a better understanding of the invention, reference may be had to the accompanying drawing, in which Fig. 1 is a diagrammatic view of a preferred embodiment of the invention, Fig. 2 is a detail view, in side elevation, of a modified form of the liquid-gas contacting member shown in Fig. 1, Fig. 3 is an end view of a modified form of the distributor forming part of the contact member shown in Fig. 2, Fig. 3A is a sectional view on the line A—A in Fig. 3, and Fig. 4 is a detail view, partly in section, of one form of the pulsating device indicated generally at 10 in Fig. 1.

Referring to the drawing, the reference numeral 1 designates the milk pipeline of a milking installation of the vacuum-operated type. Arranged at intervals along the pipeline 1 are a number of nipples or similar means 2 for connecting to this line the usual milk hoses leading from the milker units (not shown). The connecting means 2 may be of any standard form adapted to be closed to exclude air from the pipeline 1 when the milk hoses are disconnected therefrom. Milk entering the line 1 from these hoses by way of the connecting means 2 is conveyed through the pipe line to an outlet 1a in a releaser 3 which sluices out the milk to a pipe or container (not shown) under atmospheric pressure.

The milk releaser 3, which may be of any conventional form, has an outlet 4 for the released milk. The releaser 3 is maintained under partial vacuum by means of a pipe line 5 connected to the inlet side of a vacuum pump 6, the line 5 being provided with the usual vacuum regulating valve 7.

The milk line 1 may be provided with a large number of connecting means 2, depending upon the number of milking units to be connected simultaneously to this line. The connecting means 2 most remote from the releaser 3 is located between the latter and a tubular member 8 tightly connected to the milk line 1. This tubular member has a nipple 9 for supply of flushing liquid and also has a pulsating or similar device 10 for automatically varying the rate of admission of air into the member 8 by way of a supply duct 12. At its outer end, the tubular member 8 is sealed by an end wall or cover 11.

The pulsating device 10 (shown in detail in Fig. 4) may be a pneumatic pulsator of the type commonly employed in milking machines, such as that disclosed in Hapgood Patent No. 2,379,483 of July 3, 1945, in series with a pneumatic relay, it being understood that one of the pulsator outlets will be closed off and that the reciprocable valve piston of the relay will be driven pneumatically through a connection to the other of the pulsator outlets. Hence, when the vacuum side of the pulsator is connected to the vacuum line 5 as shown, the pulsating relay will alternately open and close (or throttle) the communication of duct 12 with atmospheric air. Thus, the pulsator 10 will serve to effect rapid variations in the rate of air admission into the tubular member 8 and milk line 1. Since these and other devices for effecting automatic and periodic reciprocation of a valve member are well known in the art, I have illustrated schematically the details of only one form of the device 10 in Fig. 4.

The tubular member 8 consists of a short pipe piece to which the duct 12 and the hose nipple 9 are connected. The duct 12 preferably forms an acute angle with the pipe 8 and is connected (in the flow direction) behind the nipple 9. The tubular member 8 is also provided with a sieve-like distributor 13 (Fig. 2) in the form of a washer filling the whole pipe section 8 at the end nearest the receiver 3, this washer having fine holes bored through it. In Figs. 3 and 3A, I have shown a modified form of washer 13a in which the holes are inclined to the general direction of flow in order to give a screwing motion to the liquid flowing through; or the same effect may be produced by arranging the air supply duct so that it opens tangentially into the contact chamber formed by the member 8, as shown at 12a in Fig. 2. Experiments have shown, however, that a screwing movement easily arises, even if the holes are parallel to the longitudinal direction. The part 13 or 13a can be detachably connected with the member 8. A rubber ring 18 serves to connect the member 8 tightly to the line 1, as shown in Fig. 1.

The tube nipple 9 is connected to a duct 14, which may be a hose or a fixed pipeline, communicating with a container 15 for the flushing liquid. In addition to the nipple 9, the member 8 may have several similar nipples 9a (Fig. 2) to enable all the milking units of the installation to be connected simultaneously to the member 8. It is possible in this way to draw flushing liquid through all the units to the member 8 so that these units are cleaned simultaneously with the line 1.

During flushing, the valve 7 should be put out of operation so that the largest possible vacuum is obtained in the line 1. Before the flushing is started, the connecting means 2 are closed so that air cannot enter through them after the tubes connected to the milking units have been removed. Then, two valve cocks 16 and 17 are opened so that the partial vacuum in line 5 sucks flushing liquid into the contact member 8 and thence through the line 1 and its outlet 1a. At the same time, air at atmospheric pressure or higher is admitted into this flushing liquid through duct 12, the rate of air admission being varied by operation of the pulsating device 10 so that the air flow is either intermittent or alternately increasing and decreasing. As a result, the liquid is more or less divided into slugs in the contact member 8 and line 1, and these slugs move toward the releaser 3. In the latter, the flushing liquid is sluiced out at atmospheric pressure and leaves through the outlet 4, while the air supplied is sucked off through the line 5 to the pump 6. As previously disclosed, the liquid slugs flowing through the pipeline 1 greatly improve the flushing action of the liquid and serve to remove milk deposits which would otherwise be retained in this line. The distributor 13 serves to momentarily sub-divide or split the air slugs alternating with the slugs of liquid, promptly after these air slugs are formed, so that the air slugs after passing through the distributor holes are re-formed as slugs mingled with a dense spray of flushing liquid. This mixture of air and flushing liquid is capable of completely filling the pipe line 1 and thereby thoroughly cleaning all of its parts.

In some cases, the milk pipeline 1 may be of such length that it is desirable to arrange one or more additional air inlet ducts along this pipe line, as shown at 12b in Fig. 1. In this way, the liquid slugs moving along the pipeline will be prevented from merging with each other or will be re-formed before the liquid reaches the outlet 1a in the releaser. While the duct 12b may be a branch duct from the pulsator valve 10, it is shown in Fig. 1 as being supplied with air from a separate pulsator valve 10a. Also, while the duct 12b may be of the same form as duct 12 or 12a, I have shown it extending into the pipeline 1 and terminating in a mouth portion 12c which flares or widens in the direction of flow of the flushing liquid. This mouth portion is centered in the pipeline 1 and spaced from the wall thereof, so that it forms a narrow annular passage for the flushing liquid. The duct 12 may be provided with a similar mouth portion, in which case it should enter the member 8 in front of the nipple 9 reckoned in the flow direction.

In cases where the air is to be supplied to the pipeline 1 at super-atmospheric pressure, this may be done conveniently by connecting the high pressure or outlet side of the vacuum pump 6 through a pipe line 20 with the air inlet side of the pulsating device 10a, as shown at 20a in Fig. 1. In this way, the air drawn from pipe lines 1 and 5 is compressed and reintroduced into flushing liquid at a varying rate through the member 8 and any air duct connected directly to the pipeline 1.

The installation shown in Fig. 1 may be arranged in such a way that the outlet 4 discharges into the container 15, for example, so that the flushing liquid returns to this container and is allowed to circulate through the system.

The invention is not, of course, limited to cleaning milk pipelines but is applicable generally to the cleaning of pipelines by liquid flushing.

I claim:

1. The combination of a duct, means for connecting the duct to a liquid-conveying pipe line of a milking installation, or the like, the duct being adapted for introducing a flushing liquid into the line, the pipe line having an outlet remote from said duct for discharging the flushing liquid, a gas supply duct for admitting a gas into the flushing liquid flowing through the pipe line to said outlet, and a device connected to said last duct for varying the rate of admission of gas into the flushing liquid, said gas supply duct terminating in a mouth portion which widens in the direction of flow of the flushing liquid, said mouth portion being located in the path of the flushing liquid.

2. The combination of a duct, means for connecting the duct to a liquid-conveying pipe line of a milking installation, or the like, the duct being adapted for introducing a flushing liquid into the line, the pipe line having an outlet remote from said duct for discharging the flushing liquid, a gas supply duct for admitting a gas into the flushing liquid flowing through the pipe line to said outlet, a device connected to said last duct for varying the rate of admission of gas into the flushing liquid, a vacuum pump having its inlet side in communication with said outlet of the pipe line, to draw the flushing liquid and gas through the line, and a connection between the outlet side of the pump and the gas duct for supplying air to said last duct.

3. The combination of a duct, means for connecting the duct to a liquid-conveying pipe line of a milking installation, or the like, the duct being adapted for introducing a flushing liquid into the line, the pipe line having an outlet remote from said duct for discharging the flushing liquid, a gas supply duct for admitting a gas into the flushing liquid flowing through the pipe line to said outlet, a device connected to said last duct for varying the rate of admission of gas into the flushing liquid, and a distributor inserted in the path of the flushing liquid and gas flowing through the pipe line, the distributor having a series of throughflow holes.

4. The combination of a duct, means for connecting the duct to a liquid-conveying pipe line of a milking installation, or the like, the duct being adapted for introducing a flushing liquid into the line, the pipe line having an outlet remote from said duct for discharging the flushing liquid, a gas supply duct for admitting a gas into the flushing liquid flowing through the pipe line to said outlet, a device connected to said last duct for varying the rate of admission of gas into the flushing liquid, a generally tubular member forming a contact chamber connected to the pipe line and to which said ducts are connected, the tubular member having a nipple connected with the duct for the flushing liquid, and a distributor connected to the tubular member and having a series of throughflow holes in the path of the flushing liquid and gas from said ducts, the nipple being located beyond the gas duct and the distributor being located beyond the nipple, reckoned in the direction of flow through the tubular member.

5. The combination according to claim 4, in which said distributor holes are inclined to the main direction of flow through the tubular member.

References Cited in the file of this patent

UNITED STATES PATENTS

| | | |
|---|---|---|
| 1,887,985 | Auker | Nov. 15, 1932 |
| 1,939,836 | Tolfree | Dec. 19, 1933 |
| 2,366,969 | Kiggins | Jan. 9, 1945 |
| 2,604,895 | Fechter | July 29, 1952 |
| 2,650,179 | Anderson | Aug. 25, 1953 |
| 2,680,445 | Hemminger | June 8, 1954 |